United States Patent
Nayak et al.

(10) Patent No.: US 12,139,091 B1
(45) Date of Patent: Nov. 12, 2024

(54) AIRBAG RESTRAINT SYSTEM FOR A SEAT IN A VEHICLE

(71) Applicant: GM Global Technology Operations LLC, Detroit, MI (US)

(72) Inventors: Ashish Nayak, Bhopal (IN); Chin-Hsu Lin, Troy, MI (US); Shani Jain, Panna (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/502,484

(22) Filed: Nov. 6, 2023

(51) Int. Cl.
*B60R 21/207* (2006.01)
*B60R 21/231* (2011.01)

(52) U.S. Cl.
CPC .......... *B60R 21/207* (2013.01); *B60R 21/231* (2013.01); *B60R 2021/23146* (2013.01)

(58) Field of Classification Search
CPC ............... B60R 21/207; B60R 21/231; B60R 2021/23146
See application file for complete search history.

(56) References Cited

U.S. PATENT DOCUMENTS

| | | | | |
|---|---|---|---|---|
| 10,471,920 B2* | 11/2019 | Dry | .................... | B60R 21/2165 |
| 10,625,704 B2* | 4/2020 | Dry | ...................... | B60R 21/207 |
| 10,632,958 B2* | 4/2020 | Dry | .................... | B60R 21/2338 |
| 10,710,539 B2* | 7/2020 | Cho | ...................... | B60R 21/207 |
| 10,850,699 B2* | 12/2020 | Dry | ...................... | B60R 21/207 |
| 10,926,733 B2* | 2/2021 | Dry | .................... | B60R 21/23138 |
| 11,084,447 B2* | 8/2021 | Rupp | ..................... | B60R 21/231 |
| 11,273,785 B1* | 3/2022 | Faruque | ............. | B60R 21/01554 |
| 11,285,904 B2* | 3/2022 | Jung | .................... | B60R 21/2338 |
| 11,383,667 B1* | 7/2022 | Kadam | .............. | B60R 21/23138 |
| 11,618,404 B1* | 4/2023 | Jaradi | ............... | B60R 21/23138 280/730.1 |
| 11,713,014 B1* | 8/2023 | Faruque | .............. | B60R 21/2338 280/728.1 |
| 11,772,592 B2* | 10/2023 | Min | ...................... | B60R 21/207 280/743.2 |
| 11,904,788 B2* | 2/2024 | Axblom | .............. | B60R 21/23138 |
| 11,904,795 B2* | 2/2024 | Line | .................... | B60R 22/1955 |
| 11,912,230 B2* | 2/2024 | Faruque | ................ | B60R 21/207 |
| 2013/0015642 A1* | 1/2013 | Islam | .................... | B60R 21/231 29/428 |
| 2019/0031133 A1* | 1/2019 | Dry | ....................... | B60R 21/207 |
| 2019/0054884 A1* | 2/2019 | Dry | ..................... | B60R 21/2342 |
| 2021/0009067 A1* | 1/2021 | Kadam | ................. | B60R 21/239 |
| 2023/0303024 A1* | 9/2023 | Wang | .................. | B60R 21/2338 |

* cited by examiner

*Primary Examiner* — Drew J Brown
*Assistant Examiner* — Tiffany L Webb
(74) *Attorney, Agent, or Firm* — Vivacqua Crane, PLLC

(57) ABSTRACT

An airbag restraint system for a seat for an occupant located in a vehicle includes an airbag. The airbag includes an expandable body that is inflatable from a stowed position into a deployed position and the expandable body of the airbag restraint system is deflated and stored within a cavity defined by the seat back of the seat when the expandable body of the airbag is in the stowed position. The expandable body of the airbag surrounds a portion of a thorax of the occupant of the seat when the expandable body of the airbag restraint system is in the deployed position.

20 Claims, 5 Drawing Sheets

AIRBAG RESTRAINT SYSTEM FOR A SEAT IN A VEHICLE

INTRODUCTION

The present disclosure relates to an airbag restraint system for a seat in a vehicle. The airbag restraint system includes an airbag having an expandable body that surrounds a portion of the thorax of an occupant of the seat when the airbag is in a deployed position.

Some autonomous vehicles include seats that have various features or characteristics that are not typically found in vehicles that are manually operated by a driver. For example, the seats in an autonomous vehicle may be able to recline at higher angles when compared to vehicles manually operated by drivers. Furthermore, some types of autonomous vehicles may include seats that swivel or rotate relative to the floor of the vehicle.

It is to be appreciated that traditional airbags may not always accommodate some of the unique challenges that are faced with seats for an autonomous vehicle. Specifically, if the seat is in a reclined position during a sudden deceleration experienced during a vehicle impact event, the reclined position of the occupant may challenge the effectiveness of the occupant's airbag. Furthermore, traditional seat belts may also not be able to accommodate an occupant who has rotated his or her seat such that the occupant no longer faces the front of the vehicle.

Thus, while current vehicle seats achieve their intended purpose, there is a need in the art for an improved approach to restrain an occupant within a vehicle seat.

SUMMARY

According to several aspects, an airbag restraint system for a seat for an occupant located in a vehicle is disclosed. The seat includes a seat back that defines a cavity. The airbag restraint system includes an airbag. The airbag includes an expandable body. The expandable body of the airbag is inflatable from a stowed position into a deployed position and the expandable body of the airbag restraint system is deflated and stored within the cavity defined by the seat back of the seat when the explain et ndable body of the airbag is in the stowed position. The expandable body of the airbag surrounds a portion of a thorax of the occupant of the seat when the expandable body of the airbag restraint system is in the deployed position.

In another aspect, the expandable body defines a front portion.

In yet another aspect, the front portion of the expandable body of the airbag opposes the occupant located within the seat when the expandable body is in the deployed position.

In an aspect, the expandable body of the airbag defines an upper side and a lower side.

In another aspect, the upper side of the airbag faces a ceiling of an interior cabin of the vehicle and the lower side of the airbag faces a floor of the interior cabin of the vehicle.

In yet another aspect, the expandable body of the airbag defines an energy absorption section, where the energy absorption section is located at the front portion along the upper side of the expandable body of the airbag.

In an aspect, the expandable body defines opposing sides that each correspond to one of the sagittal sides of the occupant.

In another aspect, the opposing sides of the expandable body of the airbag each face a corresponding sagittal side of the occupant when the expandable body of the airbag is in the deployed position.

In yet another aspect, the front portion of the expandable body of the airbag restricts forward motion of the occupant and the opposing sides of the expandable body of the airbag restrict sideways motion of the occupant.

In an aspect, the airbag restraint system includes a tether connected to the expandable body of the airbag, where the tether includes a strap.

In another aspect, the airbag restraint system further includes a pulley system having a plurality of wheels, where the strap of the tether is wound around the plurality of wheels of the pulley system.

In another aspect, the strap of the tether is actuated by the pulley system as the expandable body of the airbag is inflated from the stowed position to the deployed position and urges the expandable body of the airbag to expand from the stowed position into the deployed position.

In an aspect, a seat for an occupant of a vehicle is disclosed. The seat includes a seat back defining a cavity and an airbag restraint system including an airbag. The airbag includes an expandable body that is inflatable from a stowed position into a deployed position, where the expandable body of the airbag restraint system is deflated and stored within the cavity defined by the seat back of the seat when the expandable body of the airbag is in the stowed position. The expandable body of the airbag surrounds a portion of a thorax of the occupant seated within the seat when the expandable body of the airbag restraint system is in the deployed position.

In another aspect, the seat is a dedicated vehicle seat.

In yet another aspect, the expandable body defines a front portion.

In an aspect, the front portion of the expandable body of the airbag opposes the occupant located within the seat when the expandable body is in the deployed position.

In another aspect, the expandable body of the airbag defines an upper side and a lower side.

In yet another aspect, the upper side of the airbag faces a ceiling of an interior cabin of the vehicle and the lower side of the airbag faces a floor of the interior cabin of the vehicle.

In an aspect, the expandable body of the airbag defines an energy absorption section, wherein the energy absorption section is located at the front portion along the upper side of the expandable body of the airbag.

In another aspect, an airbag restraint system for a seat for an occupant of a vehicle is disclosed. The seat includes a seat back defining a cavity, the airbag restraint system includes a tether including a strap, a pulley system having a plurality of wheels, where the strap of the tether is wound around the plurality of wheels of the pulley system and an airbag. The airbag includes an expandable body that is inflatable from a stowed position into a deployed position, where the expandable body of the airbag restraint system is deflated and stored within the cavity defined by the seat back of the seat when the expandable body of the airbag is in the stowed position, and wherein the expandable body of the airbag surrounds a portion of a thorax of the occupant seated within the seat when the expandable body of the airbag restraint system is in the deployed position. The strap of the tether is connected to the expandable body of the airbag and the strap of the tether is actuated by the pulley system as the expandable body of the airbag is inflated from the stowed position to the deployed position and urges the expandable body of the airbag to expand from the stowed position into the deployed position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
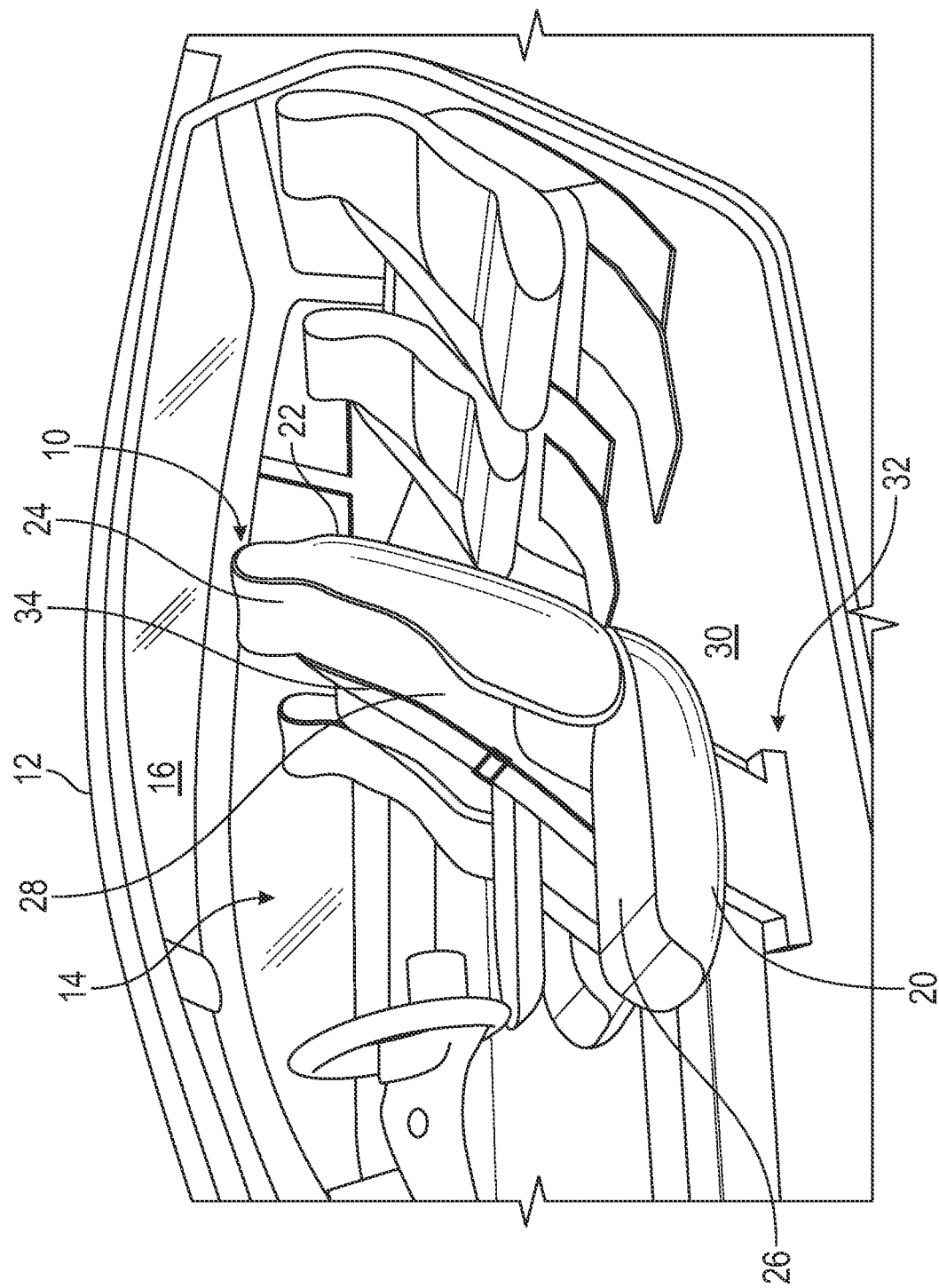
FIG. 1 is a perspective view of an interior cabin of a vehicle including a seat, according to an exemplary embodiment.

Referring to FIG. 1, an exemplary seat 10 disposed within an interior cabin 14 of a vehicle 12 is illustrated. In one non-limiting embodiment, the vehicle 12 is an autonomous vehicle. However, it is to be appreciated that the disclosure is not limited to autonomous vehicles, and the seat 10 may be employed in vehicles that are manually operated as well. The vehicle 12 may be any type of vehicle such as, but not limited to, a sedan, truck, sport utility vehicle, van, or motor home. In another embodiment, the vehicle 12 may be an aircraft or a marine vehicle. Furthermore, it is to be appreciated that while FIG. 1 illustrates the seat 10 as a dedicated vehicle seat that is normally found within the interior cabin 14 of the vehicle 12, in an embodiment the seat 10 is another type of seat that is not a dedicated vehicle seat and is not normally found within the interior cabin 14 of a vehicle. By way of example, in another embodiment the seat 10 is part of a wheelchair that is temporarily secured to the floor 30 of the vehicle 12.

The seat 10 includes a seat pan 20, a seat back 22, a seat cushion 26, and a back cushion 28. The seat cushion 26 is supported by the seat pan 20 and the back cushion 28 is supported by the seat back 22 of the seat 10. In the exemplary embodiment as shown, the seat back 22 includes an upper portion 24 that serves as a headrest for an occupant 38 (shown in FIGS. 2A-2C). The seat pan 20 is operatively connected to a floor 30 of the interior cabin 14 of the vehicle 12 by a support structure 32. In the example as shown in FIG. 1, support structure 32 allows for the seat 10 to rotate relative to the floor 30 of the vehicle 12, however, it is to be appreciated that FIG. 1 is merely exemplary in nature and the seat 10 may be non-rotatable as well. For example, in another embodiment, the support structure 32 may be a pair of seat tracks instead. As seen in FIG. 1, a seat belt 34 is provided for the seat 10. In one embodiment, the seat belt 34 is a three-point harness, however, it is to be appreciated that other types of seat belts 34 may be used as well such as, for example, a lap belt or a five-point harness.

Figure 2C:
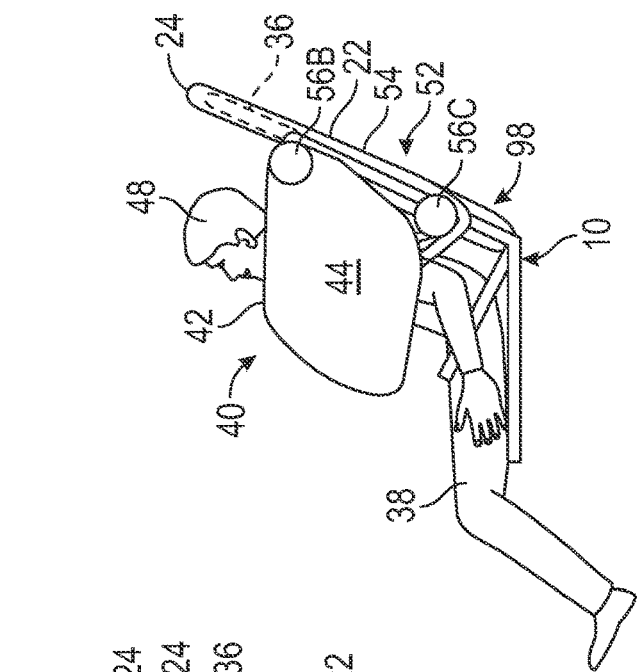
FIG. 2C is a schematic diagram of the seat in FIG. 2A where the expandable body of the airbag is in the deployed position, according to an exemplary embodiment.
Figure 2B:
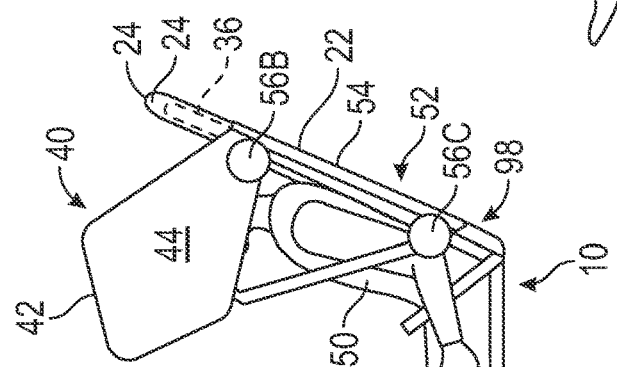
FIG. 2B is a schematic diagram of the seat in FIG. 2A where the expandable body of the airbag expands from the stowed position into a deployed position, according to an exemplary embodiment.
Figure 2A:
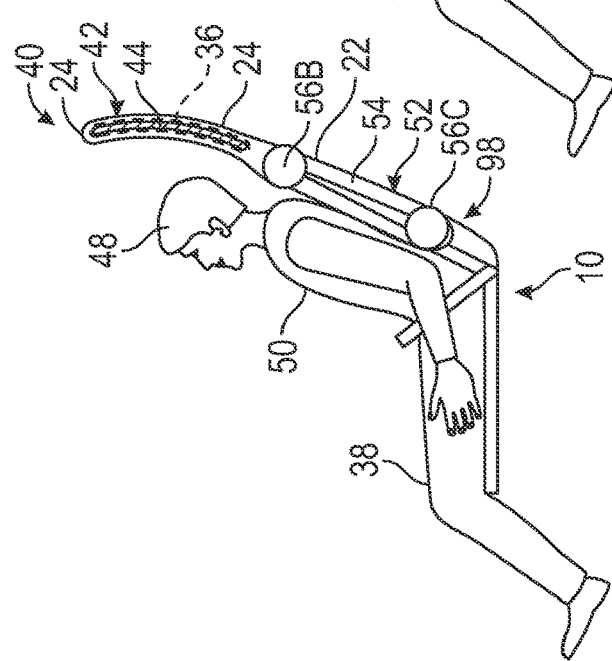
FIG. 2A is a schematic diagram of the seat shown in FIG. 1 where an occupant is seated in the seat and an expandable body of an airbag that is part of the disclosed airbag restraint system is in a stowed position, according to an exemplary embodiment.

FIGS. 2A-2C are schematic diagrams of the seat 10 for an occupant 38 of the vehicle 12. The seat 10 includes an airbag restraint system 40, which is shown in FIGS. 2A-2C. Referring specifically to FIGS. 2A and 2C, the airbag restraint system 40 includes an airbag 42 having an expandable body 44 and a tether 52 connected to the expandable body 44. The expandable body 44 of the airbag 42 includes a stowed position (shown in FIG. 2A) and a deployed position (FIG. 2C). The expandable body 44 is stored within a cavity 36 (shown in FIG. 2A) defined within the seat back 22 of the seat 10. Specifically, the cavity 36 is located at the upper portion 24 of the seat back 22 when in the stowed position.

The airbag 42 is deflated when in the stowed position and is inflated with air to expand from the stowed position into the deployed position, which is shown in FIGS. 2B and 2C. Specifically, FIG. 2B illustrates the airbag restraint system 40 expanding from the stowed position into an intermediate position between the stowed position and the deployed position, and FIG. 2C illustrates the airbag restraint system 40 in the deployed position. The airbag 42 is fully inflated when in the deployed position as shown in FIG. 2C. When in the deployed position, the expandable body 44 of the airbag restraint system 40 surrounds a portion of a thorax 50 (visible in FIGS. 2A, 2B, 4, and 5) of the occupant 38.

Figure 3:
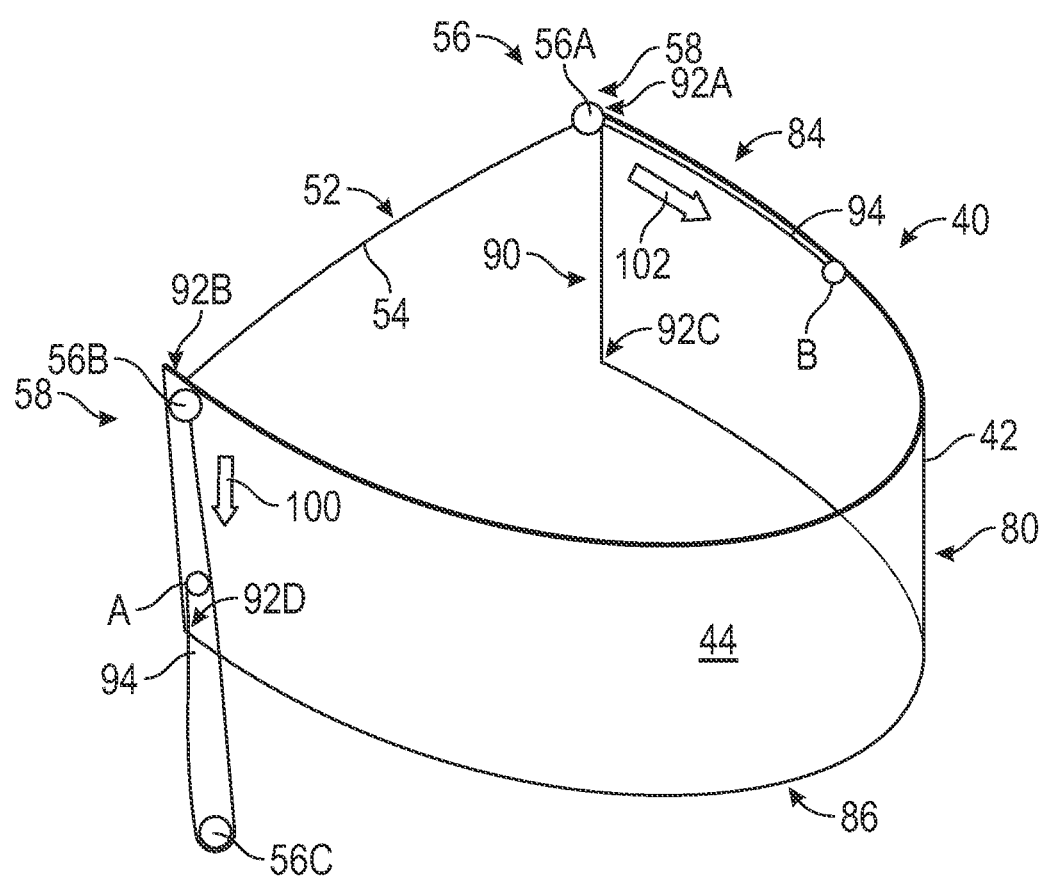
FIG. 3 is a schematic diagram of the airbag restraint system and a pulley system, according to an exemplary embodiment.

FIG. 3 is a schematic diagram illustrating the connection between the tether 52 and the expandable body 44 of the airbag 42. The tether 52 includes a strap 54 connected to a first point A and a second point B of the expandable body 44 of the airbag 42. In an embodiment, the strap 54 is constructed of a woven seat belt material. Referring to FIGS. 2A, 2C, and 3, the strap 54 of the tether 52 is wound around a plurality of wheels 56 of a pulley system 58. The elongated strap 54 of the tether 52 is actuated by the pulley system 58. As explained below, actuating of the tether 52 by the pulley system 58 urges the expandable body 44 of the airbag 42 to expand from the stowed position (FIG. 2A) into the deployed position (FIG. 2C).

Figure 4:
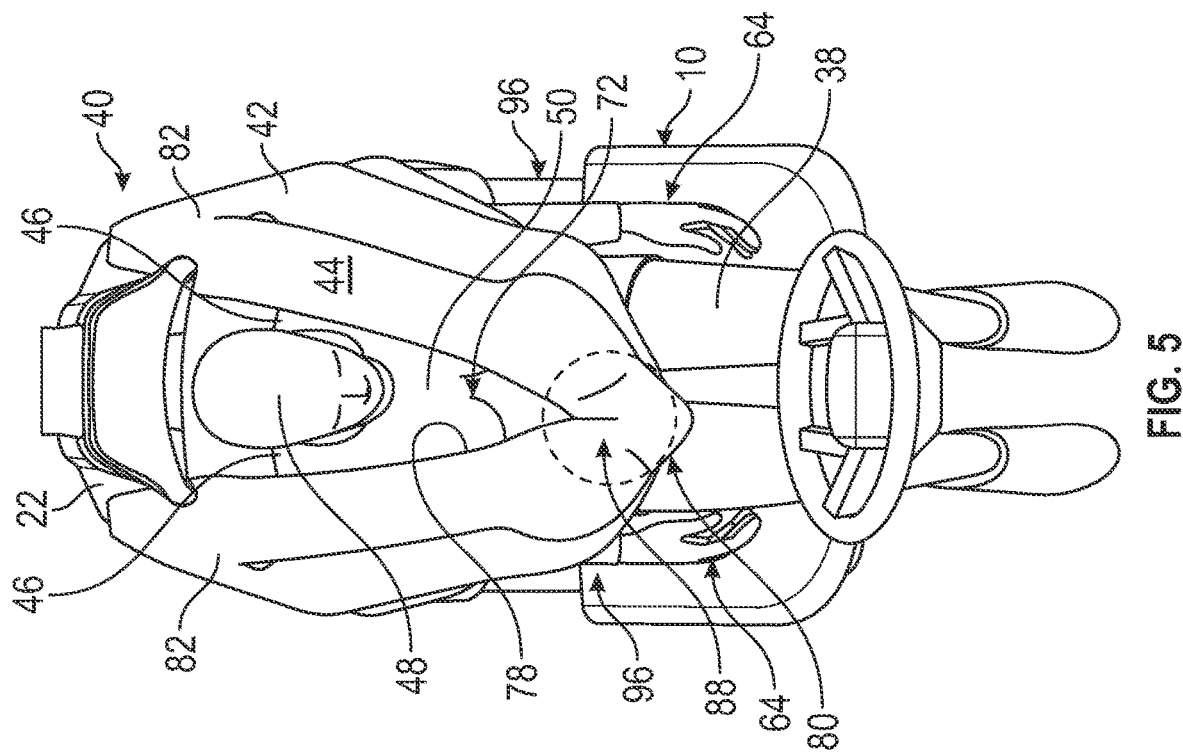
FIG. 4 is a top view of the seat where the airbag is in an intermediate position as the airbag restraint system deploys from the stowed position into the deployed position seen in FIG. 5, according to an exemplary embodiment.
Figure 5:
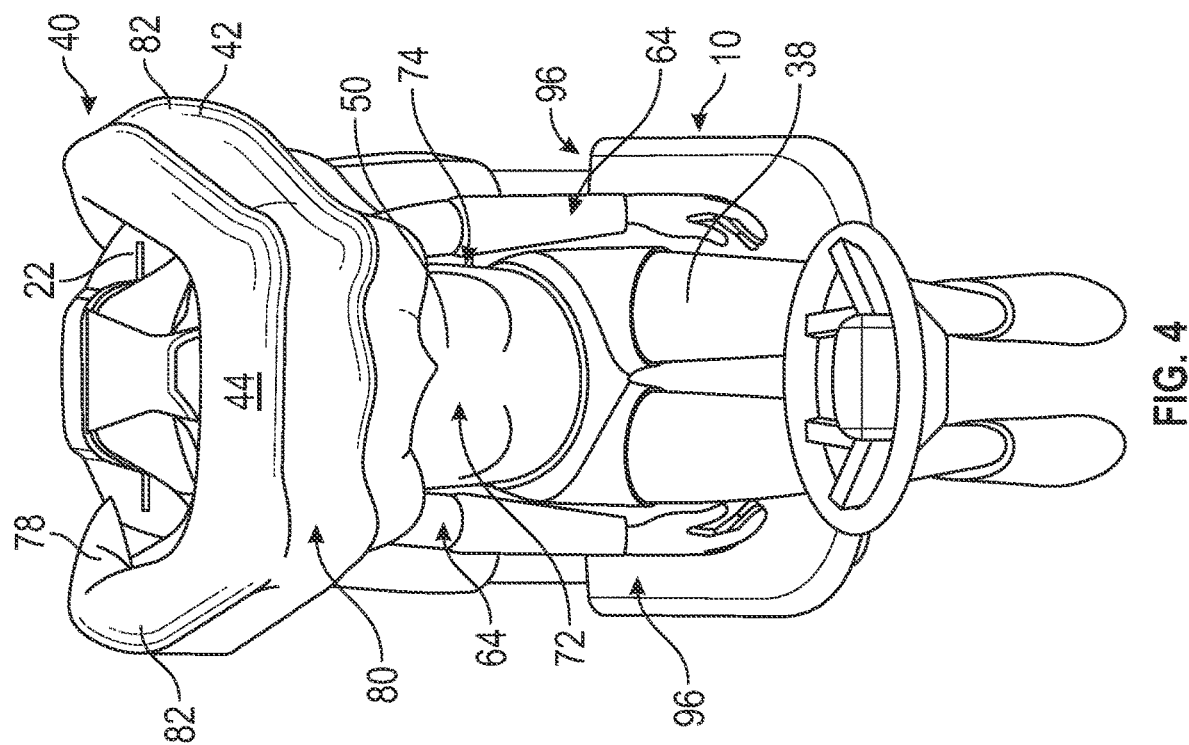
FIG. 5 is a top view of the seat when the airbag restraint system is in the deployed position, according to an exemplary embodiment.

FIG. 4 is a top view of the seat 10 as the airbag restraint system 40 deploys from the stowed position into the deployed position, and FIG. 5 is a top view of the seat 10 when the airbag restraint system 40 is in the deployed position. Referring to FIGS. 4 and 5, the expandable body 44 of the airbag 42 is inflated over the shoulders 46 and the head 48 of the occupant 38 as the airbag 42 deploys from the stowed position into the deployed position. Referring specifically to FIG. 5, when the airbag restraint system 40 is in the deployed position the expandable body 44 of the airbag 42 surrounds a portion 72 of the thorax 50 of the occupant 38. Specifically, a rear portion 74 of the thorax 50 of the occupant 38 opposes the seat back 22 of the seat 10. The portion 72 of the thorax 50 of the occupant 38 surrounding the expandable body 44 of the airbag 42 omits the rear portion 74 of the occupant 38, which opposes the seat back 22 of the seat 10.

Referring to FIGS. 4 and 5, the expandable body 44 of the airbag 42 defines a front portion 80 and opposing sides 82. The front portion 80 and both the opposing sides 82 of the expandable body 44 of the airbag 42 are positioned to surround the portion 72 of the thorax 50. The front portion 80 of the expandable body 44 of the airbag 42 opposes the occupant 38 located within the seat 10 when the expandable body 44 is in the deployed position. Each opposing side 82 of the expandable body 44 of the airbag 42 corresponds to one of the sagittal sides 64 (i.e., the left and right sides) of the occupant 38. The opposing sides 82 of the expandable body 44 of the airbag 42 face a corresponding sagittal side 64 of the occupant 38 when the expandable body 44 of the airbag 42 is in the deployed position. Accordingly, when the vehicle 12 makes a sudden stop that causes the airbag restraint system 40 to deploy, the front portion 80 of the expandable body 44 of the airbag 42 restricts forward motion of the occupant 38 while the opposing sides 82 of the expandable body 44 of the airbag 42 restrict sideways motion of the occupant 38 when in the deployed position. The opposing sides 82 of the expandable body 44 may also provide additional side cushion for a side impact scenario. Thus, once the airbag restraint system 40 is deployed as the vehicle 12 makes a sudden stop, movement of the thorax 50 of the occupant 38 is limited by the front portion 80 and the opposing sides 82 of the expandable body 44 of the airbag 42. Thus, the disclosed airbag restraint system 40 controls occupant excursion during front, oblique front, and side impact loading scenarios.

Figure 6:
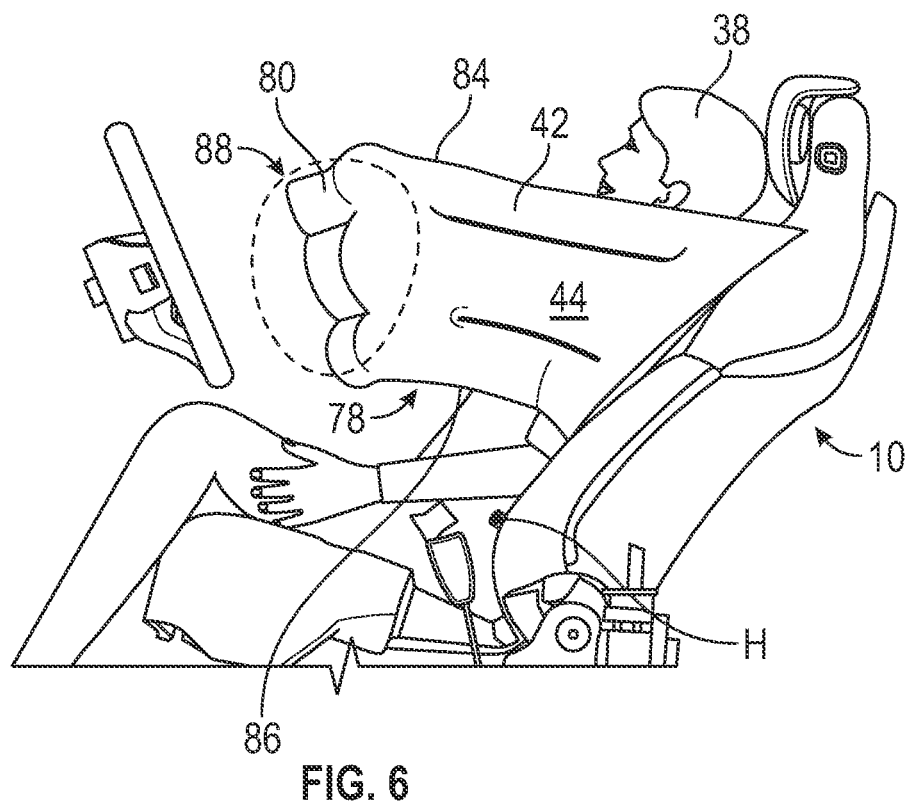
FIG. 6 is a side view of the seat when the airbag is in the deployed position, according to an exemplary embodiment.

FIG. 6 is a side view of the seat 10 when the airbag 42 is in the deployed position. Referring to FIGS. 1, 5, and 6, the expandable body 44 of the airbag 42 defines an upper side 84 and a lower side 86, where the upper side 84 of the airbag 42 faces a ceiling 16 (FIG. 1) of the interior cabin 14 of the vehicle 12 and the lower side 86 of the airbag 42 faces the floor 30 (FIG. 1) of the interior cabin 14 of the vehicle 12. In an embodiment, the expandable body 44 of the airbag 42 defines an energy absorption section 88 (indicated in dashed line in FIGS. 5-6) located at the front portion 80 along the upper side 84.

The energy absorption section 88 represents a portion of the expandable body 44 having an enhanced or increased volume when compared to the remainder of the expandable body 44 of the airbag 42. Referring specifically to FIG. 6, the increased volume of the energy absorption section 88 of the expandable body 44 of the airbag 42 absorbs energy that is created as an upper body 78 of the occupant 38 pivots about a hip point H of the occupant 38 toward the front of the vehicle 12 as the vehicle 12 makes a sudden stop during a collision. The energy absorption section 88 of the expandable body 44 represents an area of increased volume that results in enhanced or additional energy absorption of the airbag 42 as the occupant 38 pivots about the hip point H towards the front of the vehicle 12. Thus, it is to be appreciated that in embodiments, the energy absorption section 88 of the expandable body 44 of the airbag 42 may be omitted.

Referring to FIG. 3, the expandable body 44 of the airbag 42 defines a rear portion 90 that opposes the front portion 80. The expandable body 44 of the airbag 42 defines four corners 92A, 92B, 92C, 92D that are each positioned at a rear portion 90 of the expandable body 44 of the airbag 42. A first wheel 56A of the pulley system 58 is disposed at a first corner 90A positioned at the upper side 84 at one of the opposing sides 82 of the expandable body 44 of the airbag 42. A second wheel 56B of the pulley system 58 is disposed at a second corner 90B positioned at the upper side 84 at the remaining opposing side 82 of the expandable body 44 of the airbag 42. Referring to FIGS. 3, 4, and 5, a third wheel 56C of the pulley system 58 is disposed on the same side 96 of the seat 10 as the second wheel 56B (the sides 96 of the seat 10 are shown in FIGS. 4 and 5). The third wheel 56C is positioned along the seat back 22 on the same side 96 of the seat 10 as the second wheel 56B. Referring to FIGS. 2A-2C, in an embodiment the third wheel 56C may be positioned at a mid-to-lower portion 98 of the seat back 22.

The strap 54 of the tether 52 defines first and second ends 94. The first end 94 of the strap 54 of the tether 52 is connected to the first point A of the airbag 42. The first point A is disposed at the third corner 90C of the expandable body 44 of the airbag 42. The second end 94 of the strap 54 of the tether 52 is fixedly attached to the second point B of the airbag 42. The second point B is disposed along the upper side 86 at the front portion 80 of the expandable body 44 of the airbag 42. As the expandable body 44 of the airbag 42 inflates into the deployed position as seen in FIG. 5, the first end 94 of the strap 54 of the tether 52 urges the first point A of the expandable body 44 of the airbag 42 in a downward direction 100 (FIG. 3), while the second end of the strap 54 of the tether 52 urges the second point B of the expandable body 44 of the airbag 42 in an outward direction 102 (FIG. 3) towards the front portion 80.

Referring generally to the figures, the disclosed airbag restraint system provides various technical effects and benefits. Specifically, the airbag restraint system provides an approach to control occupant excursion during front, oblique front, and side impact loading scenarios by restricting motion of the occupant during a collision. It is to be appreciated that the airbag restraint system accommodates occupant in situations where the seat is in a reclined position such as, for example, when the seat is in a highly reclined position as part of an autonomous vehicle. Furthermore, some autonomous seats may be rotatable, and traditional seat belts may not be able to accommodate an occupant who has rotated his or her seat such that the occupant no longer faces the front of the vehicle. The disclosed airbag restraint system provides an approach to control occupant excursion during front, oblique front, and side impact loading scenarios when the seat is rotated and no longer faces the front of the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An airbag restraint system for a seat for an occupant located in a vehicle, wherein the seat includes a seat back that defines a cavity, and wherein the airbag restraint system comprising:
 a tether including a single strap, wherein the single strap includes a first end and a second end;
 a pulley system having a plurality of wheels, wherein the single strap of the tether is wound around the plurality of wheels of the pulley system; and
 an airbag, wherein the airbag comprises:
  an expandable body, wherein the expandable body of the airbag is inflatable from a stowed position into a deployed position and the expandable body of the airbag restraint system is deflated and stored within the cavity defined by the seat back of the seat when the expandable body of the airbag is in the stowed position, and wherein the expandable body of the airbag surrounds a portion of a thorax of the occupant of the seat when the expandable body of the airbag restraint system is in the deployed position, and wherein the expandable body defines:
a front portion that opposes the occupant located within the seat when the expandable body is in the deployed position; and
opposing sides that each correspond to one of the sagittal sides of the occupant, wherein the front portion and the opposing sides of the expandable body cooperate together to define an opening that is sized to allow the head of the occupant to pass through the expandable body as the expandable body inflates from the stowed position into the deployed position, and wherein the first end of the single strap of the tether is connected to a first point of the expandable body and the second end of the single strap of the tether is fixedly attached to a second point of the expandable body, and wherein the second point is disposed along an upper side of the front portion of the expandable body.

2. The airbag restraint system of claim 1, wherein the expandable body of the airbag defines the upper side and a lower side.

3. The airbag restraint system of claim 2, wherein the upper side of the airbag faces a ceiling of an interior cabin of the vehicle and the lower side of the airbag faces a floor of the interior cabin of the vehicle.

4. The airbag restraint system of claim 3, wherein the expandable body of the airbag defines an energy absorption section, wherein the energy absorption section is located at the front portion along the upper side of the expandable body of the airbag.

5. The airbag restraint system of claim 2, wherein the first point of the expandable body is disposed at a corner disposed along the lower side of the expandable body of the airbag.

6. The airbag restraint system of claim 1, wherein the opposing sides of the expandable body of the airbag each face a corresponding sagittal side of the occupant when the expandable body of the airbag is in the deployed position.

7. The airbag restraint system of claim 1, wherein the front portion of the expandable body of the airbag restricts forward motion of the occupant and the opposing sides of the expandable body of the airbag restrict sideways motion of the occupant.

8. The airbag restraint system of claim 1, wherein the single strap of the tether is actuated by the pulley system as the expandable body of the airbag is inflated from the stowed position to the deployed position and urges the expandable body of the airbag to expand from the stowed position into the deployed position.

9. The airbag restraint system of claim 1, wherein the first end of the single strap of the tether urges the first point of the expandable body of the airbag in a downward direction as the expandable body of the airbag inflates into the deployed position.

10. The airbag restraint system of claim 1, wherein the second end of the single strap of the tether urges the second point of the expandable body of the airbag in an outward direction towards the front portion of the expandable body as the expandable body of the airbag inflates into the deployed position.

11. A seat for an occupant of a vehicle, the seat comprising:
a seat back defining a cavity; and
airbag restraint system including:
a tether including a single strap, wherein the single strap includes a first end and a second end;
a pulley system having a plurality of wheels, wherein the single strap of the tether is wound around the plurality of wheels of the pulley system; and
an airbag, wherein the airbag comprises:
an expandable body that is inflatable from a stowed position into a deployed position, wherein the expandable body of the airbag restraint system is deflated and stored within the cavity defined by the seat back of the seat when the expandable body of the airbag is in the stowed position, and wherein the expandable body of the airbag surrounds a portion of a thorax of the occupant seated within the seat when the expandable body of the airbag restraint system is in the deployed position, and wherein the expandable body defines:
a front portion that opposes the occupant located within the seat when the expandable body is in the deployed position; and
opposing sides that each correspond to one of the sagittal sides of the occupant, wherein the front portion and the opposing sides of the expandable body cooperate together to define an opening that is sized to allow the head of the occupant to pass through the expandable body as the expandable body inflates from the stowed position into the deployed position, and wherein the first end of the single strap of the tether is connected to a first point of the expandable body and the second end of the single strap of the tether is fixedly attached to a second point of the expandable body, and wherein the second point is disposed along an upper side of the front portion of the expandable body.

12. The seat of claim 11, wherein the seat is a dedicated vehicle seat.

13. The seat of claim 11, wherein the expandable body of the airbag defines the upper side and a lower side.

14. The seat of claim 13, wherein the upper side of the airbag faces a ceiling of an interior cabin of the vehicle and the lower side of the airbag faces a floor of the interior cabin of the vehicle.

15. The seat of claim 14, wherein the expandable body of the airbag defines an energy absorption section, wherein the energy absorption section is located at the front portion along the upper side of the expandable body of the airbag.

16. The seat of claim 13, wherein the first point of the expandable body is disposed at a corner disposed along the lower side of the expandable body of the airbag.

17. The seat of claim 11, wherein the first end of the single strap of the tether urges the first point of the expandable body of the airbag in a downward direction as the expandable body of the airbag inflates into the deployed position.

18. The seat of claim 11, wherein the second end of the single strap of the tether urges the second point of the expandable body of the airbag in an outward direction towards the front portion of the expandable body as the expandable body of the airbag inflates into the deployed position.

19. An airbag restraint system for a seat for an occupant of a vehicle, wherein the seat includes a seat back defining a cavity, the airbag restraint system comprising:
a tether including a single strap, wherein the single strap includes a first end and a second end;

a pulley system having a plurality of wheels, wherein the single strap of the tether is wound around the plurality of wheels of the pulley system; and an airbag, wherein the airbag comprises:

an expandable body that is inflatable from a stowed position into a deployed position, wherein the expandable body of the airbag restraint system is deflated and stored within the cavity defined by the seat back of the seat when the expandable body of the airbag is in the stowed position, and wherein the expandable body of the airbag surrounds a portion of a thorax of the occupant seated within the seat when the expandable body of the airbag restraint system is in the deployed position, and wherein the expandable body defines:

a front portion that opposes the occupant located within the seat when the expandable body is in the deployed position; and opposing sides that each correspond to one of the sagittal sides of the occupant, wherein the front portion and the opposing sides of the expandable body cooperate together to define an opening that is sized to allow the head of the occupant to pass through the expandable body as the expandable body inflates from the stowed position into the deployed position, and wherein the first end of the single strap of the tether is connected to a first point of the expandable body and the second end of the single strap of the tether is fixedly attached to a second point of the expandable body, and wherein the second point is disposed along an upper side of the front portion of the expandable body, and wherein the single strap of the tether is actuated by the pulley system as the expandable body of the airbag is inflated from the stowed position to the deployed position and urges the expandable body of the airbag to expand from the stowed position into the deployed position.

20. The airbag restraint system of claim 19, wherein the seat is a dedicated vehicle seat.

* * * * *